(12) United States Patent
Lippman et al.

(10) Patent No.: US 8,089,887 B2
(45) Date of Patent: Jan. 3, 2012

(54) METHOD FOR AUTOMATIC SIGNAL ROUTING IN AD HOC NETWORKS

(75) Inventors: Andrew Benjamin Lippman, Salem, MA (US); David P. Reed, Needham, MA (US); Aggelos Bletsas, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 922 days.

(21) Appl. No.: 10/299,973

(22) Filed: Nov. 19, 2002

(65) Prior Publication Data

US 2004/0095920 A1    May 20, 2004

(51) Int. Cl.
*H04L 12/26* (2006.01)
*H04J 1/10* (2006.01)
*H04J 3/08* (2006.01)
*H04J 3/06* (2006.01)

(52) U.S. Cl. ......... 370/246; 370/492; 370/501; 370/516
(58) Field of Classification Search ........................ None
See application file for complete search history.

(56) References Cited

U.S. PATENT DOCUMENTS

| | | | | |
|---|---|---|---|---|
| 3,651,458 | A * | 3/1972 | Reynolds et al. | 714/807 |
| 5,430,773 | A * | 7/1995 | Marbot | 375/373 |
| 6,430,241 | B1 * | 8/2002 | Rupprecht et al. | 375/358 |
| 6,510,174 | B1 * | 1/2003 | Sexton et al. | 375/213 |
| 7,027,773 | B1 * | 4/2006 | McMillin | 455/41.2 |
| 2002/0128786 | A1 * | 9/2002 | Alexander | 702/66 |
| 2003/0073447 | A1 * | 4/2003 | Ogaki et al. | 455/456 |
| 2003/0202469 | A1 * | 10/2003 | Cain | 370/230 |
| 2004/0218617 | A1 * | 11/2004 | Sagfors | 370/412 |
| 2005/0054296 | A1 * | 3/2005 | Chuang et al. | 455/63.1 |
| 2005/0232307 | A1 * | 10/2005 | Andersson et al. | 370/503 |

OTHER PUBLICATIONS

Broch, Josh; Johnson, David; Maltz David, "The Dynamic Source Routing protocol for Mobile Ad Hoc Networks", IETF draft, Mar. 13, 1998, Section 5.1.1.1.*

Laneman et al. "Energy-Efficient Antenna Sharing and Relaying for Wireless Networks," *IEEE Wireless Communications and Networking Conference* (WCNC-2000), (Chicago, IL), Sep. 2000, pp. 7-12.

Shelswell. "The COFDM Modulation System—The heart of Digital Audio Broadcasting," Research & Development Department, Policy & Planning Directorate, British Broadcasting Corporation, 1996, pp. 1-13.

Foschini et al. "On Limits of Wireless Communications in a Fading Environment when Using Multiple Antennas," *Wireless Personal Communications*, 6: 1998, pp. 311-335.

Zheng et al. "Diversity and Multiplexing: A Fundamental Tradeoff in Multiple Antenna Channels," Department of Electrical Engineering and Computer Sciences, University of California, Berkeley, CA, Mar. 29, 2002, pp. 1-48.

Foschini et al. "Simplified Processing for High Spectral Efficiency Wireless Communication Employing Multi-Element Arrays," *IEEE Journal on Selected Areas in Communications*, vol. 17, No. 11, Nov. 1999, pp. 1841-1852.

(Continued)

*Primary Examiner* — Warner Wong
(74) *Attorney, Agent, or Firm* — Norma E. Henderson

(57) ABSTRACT

A method and system provide routing of signals through a communications network. A transmitted signal is received. The signal has an associated parameter that is monitored as the signal is received. The parameter indicates the extent to which prior retransmission of the signal has occurred. The signal is retransmitted only if its parameter satisfies at least one predetermined criterion.

27 Claims, 5 Drawing Sheets

OTHER PUBLICATIONS

Shepard. "A Channel Access Scheme for Large Dense Packet Radio Networks," pp. 1-12, as appeared in Proceedings of ACM SIGCOMM '96, Oct. 1996.

Tarokh. "Space-Time Codes for High Data Rate Wireless Communication: Performance Criterion and Code Construction," *IEEE Transactions on Information Theory*, vol. 44, No. 2, Mar. 1998, pp. 744-765.

Viswanath et al. "Opportunistic Beamforming using Dumb Antennas," *IEEE Transactions on Information Theory*, vol. 48, No. 6, Jun. 2002, pp. 1277-1294.

Gupta et al. "Critical Power for Asymptotic Connectivity in Wireless Networks", pp. i-xx. in *Stochastic Analysis, Control, Optimization and Applications: A Volume in Honor of W.H. Fleming*, W. M. McEneaney, G. Yin, and Q. Zhang (Eds.), Birkhäuser, Boston 1998.

European Telecommunications Standards Institute—ETSI TS 100 605 V7.1.0 (Dec. 1999) Technical Specification, Digital cellular telecommunications system, Global System for Mobile communications (GSM), Valbonne, France, (GSM 09.10 version 7.1.0 Release 1998) pp. 1-43.

\* cited by examiner

METHOD FOR AUTOMATIC SIGNAL ROUTING IN AD HOC NETWORKS

TECHNICAL FIELD

The invention generally relates to network-based communications, and, more particularly, to methods and apparatus for routing of communications through a network.

BACKGROUND

Digital communications networks have existed for over thirty years, for example, in wired and packet radio formats. One of the first packet radio network designs, called Alohanet, included a set of nodes that communicated with other members of the network via a set of relay, or base stations.

In wired computer networks, Ethernet-based systems include features designed to avoid message transmission conflicts. Computers on a single, Ethernet-based interconnection wire can independently send packets, or bursts, of information among themselves on the same wire, by multiplexing those transmissions in time. This "listen-before-talk" technique is called Carrier Sense Multiple Access with Collision Detection (CSMA-CD). An analogous communication system appears in Citizen's band radio, for example, through which one listens before transmitting, thus providing an ad hoc way for two or more stations in a network to share a particular frequency channel.

As networks of greater density appeared, it became desirable to segregate network nodes into smaller groups interconnected by special processors that relayed data between network segments. These processors are generally called routers, and are usually implemented as special purpose machines that perform few additional functions. For example, routers are not commonly used for user tasks such as mail or word processing or sensing. Router-based systems scale well, and are the basis for the Internet.

More recently, interest in ad hoc networks has emerged. An ad hoc network lacks a predefined topology; installation or setup of a node typically must be nearly automatic. Ad hoc networks can provide a large variety of services, for example, wireless LANs for computers.

Some communications networks, for example, mobile telephone networks, involve mobile units. A mobile telephone network includes portable devices that all communicate with a base station. Telephone calls are transmitted between the handset and the cell site to which it is currently closest. The cell relays the communications to the public telephone network, a private data network or directly to another phone in that same cell or another cell.

The cellular nature of the network is established by the planning of the cell antenna base station sites. The base stations are designed to be dense enough to permit the desired number of simultaneous communications links specified by the operator of the network.

In general, these networks suffer from similar problems. Whether via wire, as for a local area network, or via open geographic space, as for cellular telephony, the total communications traffic in the network initially increases with an increasing population of terminals; then the network saturates and further increases in active terminals do not result in increased total volume of communications, i.e., total throughput.

Thus, a typical cellular network has a limited capacity, in part due to sharing of radio frequencies by communications from multiple users. To a limited extent, multiple communications can take turns using a particular frequency in a particular geographic region, however a saturation level is typically reached as the number of communications attempting to use the same frequency increases. Thus, as a saturation level is reached, each user may be required to relinquish some usage of the communication frequency.

Newer network designs, which respond to this scaling problem, have demonstrated that scaling can be improved when the members of the network cooperatively engage in the communications. For example, in one approach, each node can be a data source or recipient, and all nodes can also act as relays or routers for information destined for other nodes. Each packet or message is decoded at each node that receives it, and that node then makes a decision whether to forward it to another node that will advance the packet closer to its destination.

This cooperative form of transport can localize communications and allows the same channels to be reused by multiple geographically distributed terminals or nodes. In a wired system, for example, routers can support such channel reuse. In both wired and radio communications systems, the notion that each member of the network is also a router, and thus relays information on behalf of other communicators, is embedded in the notion of ad hoc networks.

An advantage of this approach is that the decision process can be updated, for example, if the nodes are mobile and moving. A disadvantage arises because packets are typically decoded so that the forwarding node can examine the source and destination information and the number of "hops" the data has already made. The hop count is updated, the packet is re-coded for network transmission and the packet is passed onwards. Hence, the retransmitted packet is delayed by at least one packet transmission period plus whatever processing time is required for the decoding, encoding and forwarding decision.

SUMMARY OF THE INVENTION

The invention features methods and systems for multiple hop distribution of information between end nodes via relaying or repeating of the information by intermediate nodes. The methods and systems, among other advantages, can reduce overall network transmission power because an originating node's signal need only reach one node in the path between the originating node and an ultimate destination node. Further, since power consumption can be reduced, the same transmission channel used by the originating node can be reused in a nearby geographic area without interfering with the originating node's communication of information.

A further power savings advantage can be provided when several repeaters and/or relays cooperatively regenerate a signal. Any recipient—the intended receiver, an intermediate relay station, or an repeater station—can utilize multiple received versions of the signal to obtain improved signal detectability. Thus, a combined signal can aid detectability rather than interfere with reception.

A limited geographic range of operation of network nodes can also provide a scalable network. Nodes can be added to a network without a proportionate consumption of network communications bandwidth.

In particular, the methods and systems include routing schemes that make relaying and/or repeating decisions in real time by analyzing the signal domain for discernable characteristics of the incident signal. This contrasts with other routing systems that make the decision to forward a signal by decoding the information in a message to determine if a particular node is in the path between the sender and the recipient. Such routing systems can utilize algorithms based on address characteristics, on a model of the geography of the node distribution, or on other criteria. Relaying and repeating nodes, according to principles of the invention, also contrast with prior repeaters that automatically forward incident signals without discrimination (the latter provide extended area or range of coverage of a communication).

A network, according to principles of the invention, can make routing decisions based on suitably processed signal parameters, e.g., radio-frequency signal parameters, rather than the content of a message. The invention exploits the facts that a signal received from multiple sources may have a recognizable signature, and that the multiple copies of a signal that can be received by a node need not fully cancel each other. Instead, the combined signal provided by the multiple copies reveals aspects of the history of the copies, e.g., past relaying and/or repeating.

Thus, the routing delay is not defined by the time it takes to process the content of a packet or quantum of information; rather, the routing delay can arise from the processing delay contributed by the signal equipment, be it digital or analog processing. This type of processing delay can be negligible in comparison with that related to data rate processing. Accordingly, the invention features methods and apparatus for routing communications, through a network. In part, the invention features network nodes that base relay decisions on communications signal parameters related to the raw signal domain, rather than data sent as part of the communication. Thus, for example, messages can be relayed from their source to their final destination without intermediate relay nodes decoding the message. Message transmittal delays can be relatively very small.

According to principles of the invention, a cooperative network can provide communications relayed by members of the network without the delay imposed by decoding the contents of an information packet. Such networks can provide many advantages, including: real-time communications such as telephony; reduced power required by each node in the network; scaling to accommodate new members of the network since each new member can contribute to the overall capacity of the network; and reliable communications even when no clear signal path between a node and a fixed base station exists.

The methods and apparatus utilize one or more parameters, i.e., attributes or characteristics, of a received signal to support a relaying decision process. Parameters can include, for example, a signal amplitude, a signal phase and/or a signal time delay. The invention provides signal relaying with little or no decoding of the signal.

For example, for a signal that is a pulse train of a digital RF communication, pulse shape and/or phase parameters can be monitored to support the relay decision process. By utilizing signal attributes, rather than data encoded in the signal, the relay decision can be made with less delay and with less signal processing overhead.

The relay decision process, according to principles of the invention, entails operations performed in the modulated signal domain, i.e., by operating on the signal medium itself, in contrast to operations performed on information encoded in the message, such as its destination. Thus, decisions are based, at least in part, on information extracted from the signal domain rather than entirely from the data domain.

Features of the invention can provide improved efficiency of communications in a network by supporting localization of information flow through the network via a series of relays acting as intermediaries. This localization can reduce the extent of propagation of a communication between any two nodes in the network and thus allow other communications to proceed at the same time through other nodes in the network. Thus, features of the invention can improve quality-of-service for real-time applications. Delay and variance of delay (i.e., jitter) can be reduced.

Aspects of the invention can benefit numerous types of communications. These include, for example, radio broadcast networks, Internet multicasting and mobile ad hoc networks. Aspects of the invention can be of particular benefit for real-time applications such a mobile telephony.

The invention can remedy several problems encountered in prior networks. For example, relaying delays can be reduced, a need for setup of a relaying site can be eliminated, nodes can move during a communication, and total power consumed by communications can be reduced.

Accordingly, in a first aspect, the invention features a method for routing signals through a communications network. The method includes receiving a transmitted signal. Each signal has an associated parameter. This parameter is monitored as the signal is received; the parameter indicates the extent to which prior retransmission of the signal has occurred.

The signal is retransmitted only if its parameter satisfies at least one predetermined criterion. The criterion can be chosen to limit, for example, the number of retransmissions of a signal. The method can include repetition of the monitoring and retransmission process for some or all received signals.

Retransmission of the signal can commence prior to completion of its reception. For example, if the signal includes a pulse train, a pulse can be retransmitted prior to completion of reception of the full pulse.

The parameter can be, for example, a signal attribute related to a signal amplitude, phase and/or time delay. The parameter can be a measure of a distortion of an attribute. The predetermined criterion can be a threshold time delay, for example, a maximum allowable time delay for a signal relative to the time the signal was transmitted by the originating node.

The parameter of a pulse transmission can be a pulse time delay, as determined, for example, via observation of the edge of the pulse. Thus, the pulse can be retransmitted, for example, if the pulse time delay does not exceed the threshold time delay. Useful parameters generally include those that enable intermediate, potential relay nodes to ascertain whether the original signal has already been relayed, and/or how long it has been propagating.

The parameter can include a signal time delay relative to a reference time, and a predetermined criterion can include a preselected maximum acceptable signal time delay. A reference time can be obtained, for example, from a universally available clock signal or by cooperative synchronization of internal clocks.

The parameter can be associated with a number of times a signal has been relayed. This can be indicated by a distortion of the signal as the original transmission becomes mixed in the transmission medium with other delayed relays of the same signal. A distortion can be, for example, a distortion of a signal phase or a distortion of a shape of the signal amplitude. The method can also include selection of a pulse duration that is greater than a preselected maximum permissible pulse time delay.

Signals can be received and retransmitted by a node in the network. In some embodiments, the node can retransmit a signal only if the node is a participant in a communication pathway between a source and a destination associated with the signal. In some embodiments, the signal is retransmitted with a power level sufficient only for decodable reception by neighboring nodes within a selected range. In these embodiments, a radio receiver, for example, might still receive some low-level additional signal from other transmitters in the vicinity.

The transmitted signal can be received from more than one location, and can be retransmitted to more than one location. A location can be, for example, a node or a reflection site, such as a building that reflects an RF signal.

The signal can be retransmitted while blocking reception of any signal having a frequency effectively the same as a frequency of retransmission.

The transmitted signal can include sub-signals that each are associated with a different frequency within a band of frequencies. The transmitted signal can be associated with at least one message.

In a second aspect, the invention features a system for signal routing. The system includes a receiver that receives a transmitted signal, and includes a monitor that monitors a parameter associated with the signal. The system also includes a transmitter for retransmitting the signal only if the parameter associated with the signal satisfies at least one predetermined criterion.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

As described in the following, signals have an associated signal "parameter". The term "parameter" herein means an attribute or characteristic of the energetic or physical makeup of the signal. Thus, a parameter does not include data purposefully encoded into the signal. Parameters can include, for example, a delay value, a power level, a frequency, and can be measured by examination of an initial portion of a received signal. In more detail, a parameter can be, for example, an absolute or relative time of delay, a change in power level of a particular frequency, a presence or absence of a particular frequency, or a phase shift.

An "electromagnetic signal", such as a radio-frequency (RF) signal, has, inter alia, amplitude, phase and timing attributes. Such attributes can be observed without decoding data carried by a signal manifested by an RF transmission. Such signal parameters can be affected, for example, by loss of power due to distance traveled, interference between two or more signals, and delays due to distance travelled and relaying.

The term "signal" herein refers to a communication as it exists in a communications medium. A "signal" can refer to one or more complete transmissions, or a portion of a transmission. For a RF pulse train, for example, the term "signal" is interchangeably used to refer to a pulse or pulses of the train, or to a portion of the pulses of one or more communications, or to one or more entire communications.

The "extent of retransmission of a signal" is herein understood to refer to a number of times a received signal has been relayed and/or a degree of delay associated with the time of arrival of the received signal. The extent of retransmission can be, for example, a relative delay between two or more constituent portions of the signal that are received from different locations, and/or a number of times a signal has been relayed by intermediate nodes in a network. The terms "relay" and "repeat" herein refer to retransmission of a received signal. "Relay" refers specifically to retransmission of a signal at a frequency different from the frequency of reception of the signal, while "repeat" refers specifically to retransmission at the same frequency as the frequency of reception of the signal. When the context is more general, the terms are herein used interchangeably to refer to retransmission, i.e., forwarding, of a signal.

Figure 1:
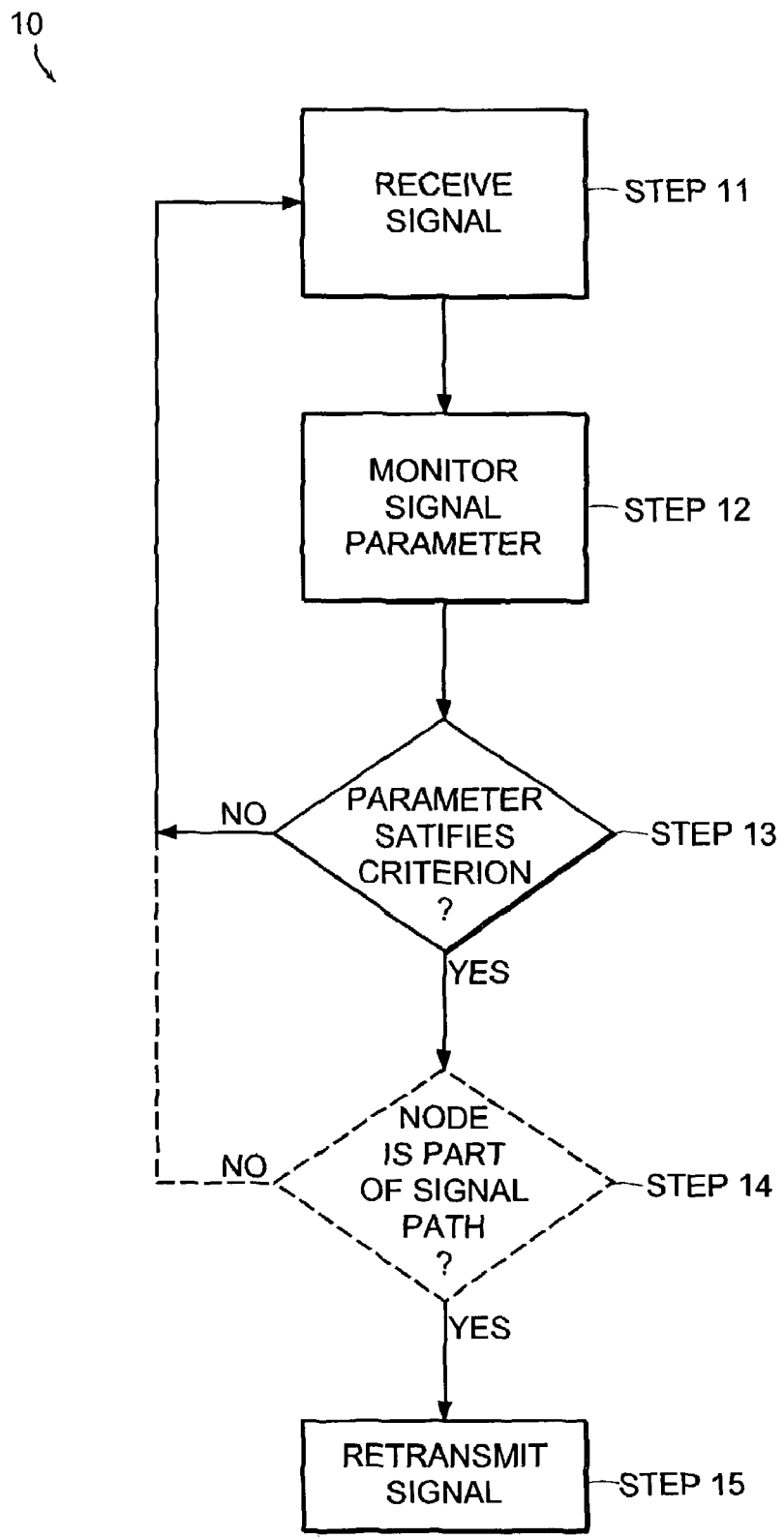
FIG. 1 is a flowchart of an embodiment of a method for routing signals.

First, referring to FIG. 1, some principles of the invention are described in broad overview. FIG. 1 is a flowchart of an embodiment of a method 10 for routing signals. The method includes receiving a signal (STEP 11), monitoring a parameter that indicates an extent of retransmission of the signal (STEP 12), comparing the parameter of the signal with a predetermined criterion (STEP 13), and retransmitting the signal if the predetermined criterion is satisfied by the parameter (STEP 15).

Optionally, the signal can be retransmitted by a receiving node only if the node is a participant in a source-to-destination pathway of a communication associated with the signal (STEP 14). Many implementations of the invention require determining whether a node is in the communication path in addition to determining whether the node should forward the communication based on an analysis of a parameter of a signal. Principles of the latter aspect of the invention will be described first, followed by description of the in-path requirement.

The signal travels through a network via, for example, electrical, optical and/or wireless means of communication. Although the illustrative embodiments described herein focus on radio-based systems, principles of the invention can be advantageously applied to communications that are transmitted via a wide variety of media, for example, optical networks, broadcast systems using other portions of the electromagnetic spectrum, wired systems, etc.

Features of the method are well suited, for example, to ad hoc RF networks that utilize RF pulse trains for digital communications. The signal can originate at a node, and can be intended for eventual reception at a final destination node. The signal is relayed via intermediate nodes.

The method features a mechanism for the relay decision process that does not require decoding of the signal, in contrast to many prior art methods. The relay decision process is based on an assessment of a parameter of the received signal. Utilization of the parameter permits a quicker decision and retransmission process than typically possible in prior systems.

The method 10 can be implemented, for example, in a packet-based digital communications network. The raw characteristics of the transmission medium itself are utilized to deduce how many times the packet has been amplified or forwarded, and to infer whether the packet of information can be productively forwarded towards its destination node or terminal.

Thus, in the case of RF-packet transmission, no decoding is required and delivery delay related to decoding is avoided. All processing is done in the realm of the RF medium. Similarly, in a wired system, using, for example, either base-band data transfer, as for an Ethernet configuration, or modulated transmission, as for a cable television data delivery system, the raw signal is processed, rather than the data within the packet.

Features of the invention have several advantages over prior systems. Transmission and relaying delays can be reduced, making a network according to the invention particularly useful for a point-to-point telephone conversation. Further, since each node needs only enough transmission power to reach a nearby node (as opposed to reaching, for example, a cell tower), the RF channel that is used for the transmission can be re-used within the same geographic area. In effect, cells are defined by the nature of the communications path instead of the predefined layout of, for example, towers.

Since power consumption can be reduced, a portable radio system can operate for a longer period of time on battery power.

Thus, the method 10 provides, for example, wireless communications in which the same RF spectrum is used by several nodes in the same general region or area, without mutual interference between different nodes simultaneously using the same frequencies for different communications. By increasing the spatial density of nodes, and operating the nodes at lower power, the spatial density of data being transmitted at any one time can increase. In other words, the total quantity of communications in the geographic space is increased, in part because the increasing number of nodes does not compete for bandwidth. This total quantity of communications can be referred to as the throughput of that geographic space.

Further, the method 10 provides a relay process that minimizes the delay usually associated with a message that is repeatedly relayed. The relay decision process entails operations performed in the modulated signal domain, i.e., by operating directly on the RF medium, rather than primarily relying on information contained in the message (such as its destination identity or location.)

It will be understood by one of ordinary skill that an RF signal domain, for example, can be operated on via an intermediate frequency (IF) domain. For example, some signal processing schemes involve tuning and translation of an RF signal to convert the RF signal to a signal having an intermediate frequency. The intermediate frequency signal can then support easier signal processing.

The method 10 can provide a relay decision process that occurs in real time, that is, for example, without packet-related baseband decoding and processing delays. In contrast, the method 10 can entail delays due to time-of-flight of a signal and analog processing of the signal. Such delays can be small in comparison with information data rate-based delays.

As indicated with respect to STEP 14, the method 10 can include a further requirement that is imposed on a node before the node is permitted to retransmit a received signal: the node is required to be a member of a source-to-destination pathway of the signal. Thus, in one implementation of the method 10, a relay decision requires that a received signal satisfy at least two distinct criteria: first, retransmission by the node should usefully add energy to the signal (e.g., based on the signal parameter); and, second, the relay node should be a member of a path between the points of origination and destination.

First, energy can usefully be added, for example, when retransmission will enhance reception at the destination or at other intermediate nodes to an extent that can significantly assist signal decoding. It can also be desirable to relay the signal if it is not too late in a particular source-to-destination communication. In effect, the signal should not be allowed to propagate indefinitely.

Thus, for example, the predetermined criterion indicating the propriety of retransmission can be a maximum permissible delay relative to a bit period. Retransmission of a bit when the delay is greater than the maximum permissible delay could impair a later-receiving node's ability to decode the bit.

Second, an intermediate node determines if it is a member of a communication's pathway prior to forwarding the communication. Implementations of the pathway decision process are discussed below.

Figure 2:
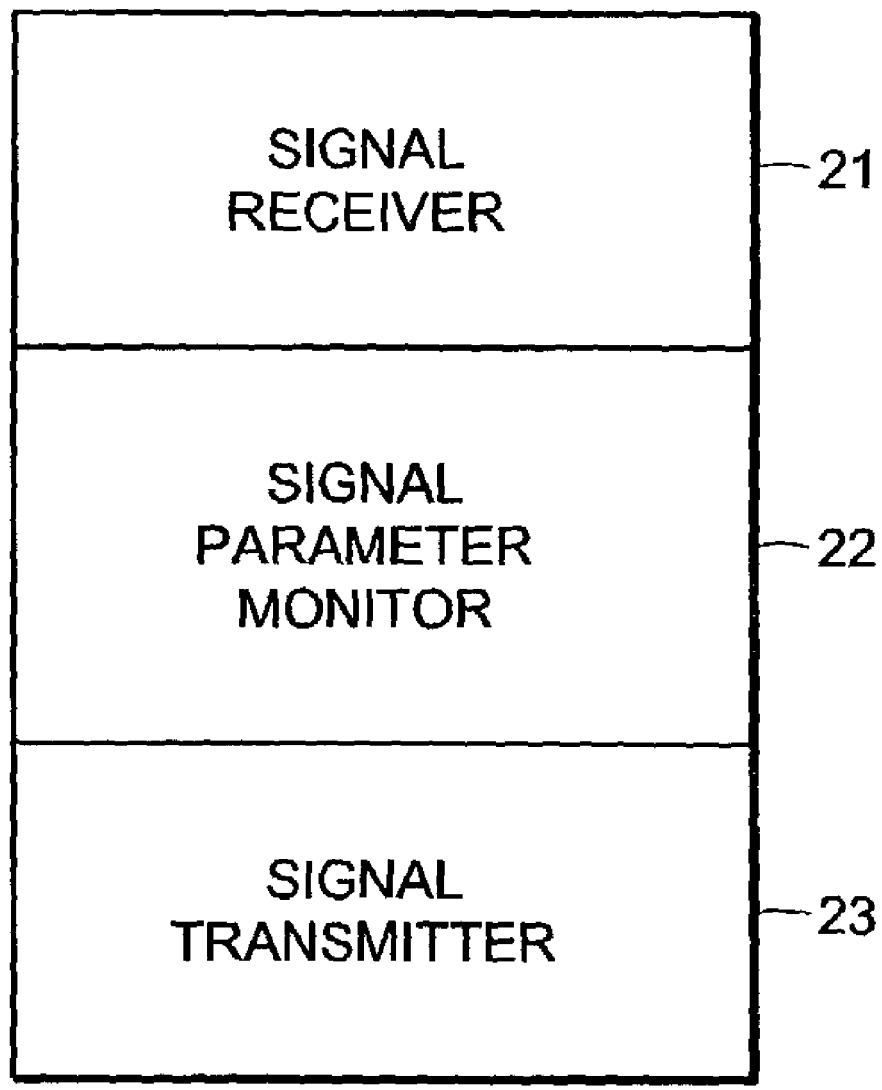
FIG. 2 is a block diagram of an embodiment of a node, which can implement the method of FIG. 1.

FIG. 2 is a block diagram of an embodiment of a node 20, according to principles of the invention. The node 20 includes a signal receiver 21, a signal parameter monitor 22 and a signal transmitter 23. Portions or all of the signal receiver 21, the signal parameter monitor 22 and the signal transmitter 23 can be implemented in one or more processors, for example, a computer microprocessor integrated circuit.

The receiver 21 and the transmitter 23 include circuitry, which can be shared, to respectively receive and transmit communications via a network, such as an optical, electrical or wireless network.

More generally, aspects of the node 20 can be implemented in software, firmware or hardware (e.g., as an application-specific integrated circuit). The software may be designed to run on general-purpose equipment or on specialized processors dedicated to the functionality herein described.

For an RF pulse train, an amplitude, phase and/or time delay of the RF pulses can be monitored at STEP 12 (see FIG. 1). Some factors that can affect a parameter of a signal are described for an RF pulse train, referring to FIGS. 3A and 3B.

Figure 3A:
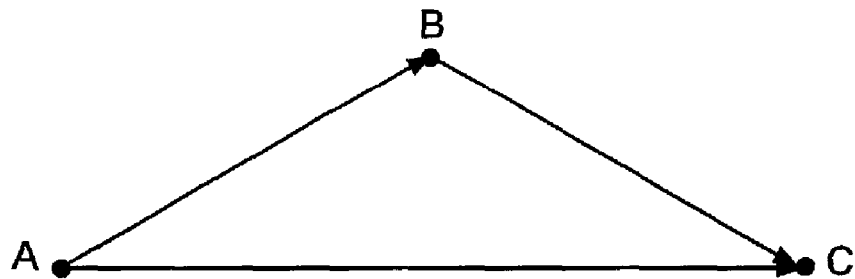
FIG. 3A is a diagram that illustrates a 3-node portion of an embodiment of a network.

FIG. 3A is a diagram of a portion of a network. The portion includes three nodes, A, B and C. Node A transmits a signal; the signal that arrives at node C includes a component received directly from node A and a component relayed via node B.

A delay associated with the received signal can arise, in particular, from two factors: 1) node-to-node path length (here, node A to node C, and node A to node B to node C); and 2) retransmission delay by a node (here, by node B). Hence, in the present example, the signal arriving from node B is delayed relative to the direct signal from node A due to both a greater path length and a greater number of retransmissions.

Figure 3B:
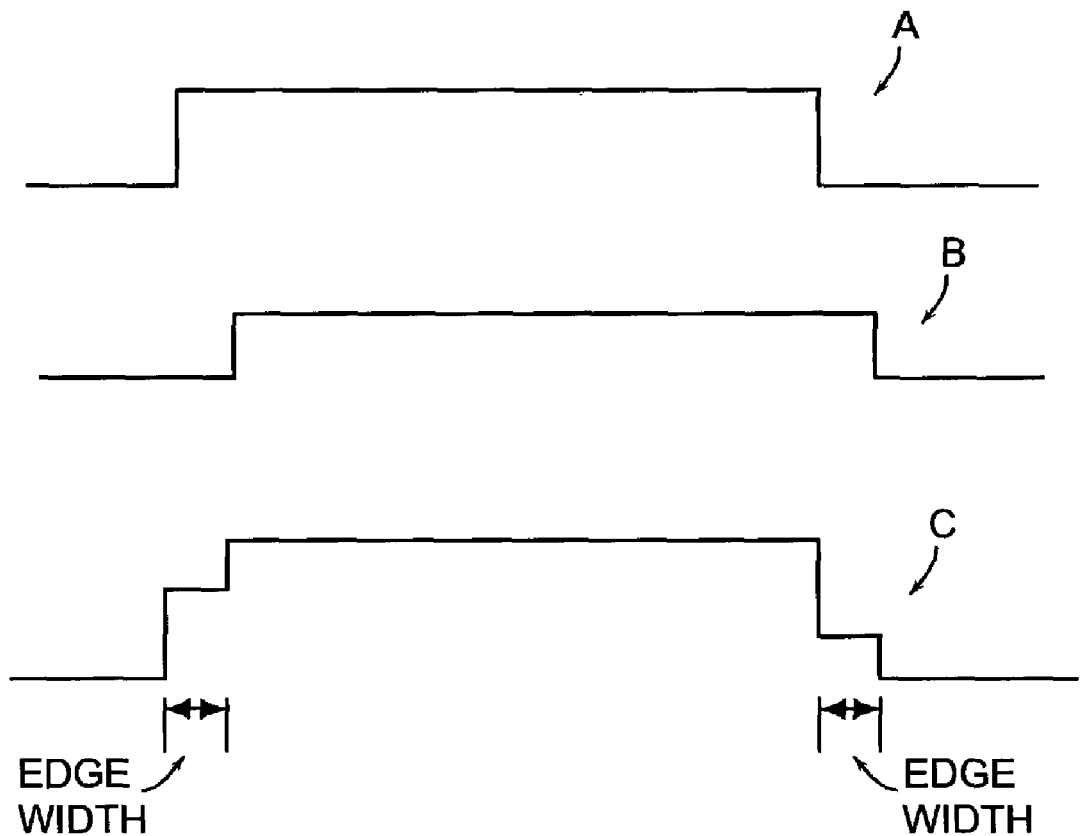
FIG. 3B is a graph that illustrates the amplitude of an exemplary radio-frequency pulse arriving at a node, according to principles of the invention.

FIG. 3B is a graph that illustrates the composition of an embodiment of an RF pulse arriving at node C. The pulses, illustrated amplitude envelopes, are highly simplified representations of a true RF pulse. In particular, only an amplitude component is illustrated, i.e., the oscillatory nature and associated frequency components of the signal are not illustrated.

The pulse arriving from node B combines with the pulse arriving from node A, and is thus received at node C. Due to the time offset between the two pulses, their combination produces a resultant pulse having distorted edges. A width of the distorted edge can be defined, for example, as a full width of the distorted portion of a pulse, as illustrated in FIG. 3B. In one implementation of the method 10 for routing signals, an edge distortion parameter, for example, the full width of the edge, is utilized as the parameter for selection of signals to retransmit. The greater the number of relays, the more distorted the signal edge will become and, hence, the greater will be the edge width.

When an edge distortion is utilized as the selection parameter, the predetermined criterion can be, for example, a maximum edge width. Thus, a signal that includes an excessively relayed (and therefore excessively delayed) component can be selected for non-retransmission. The method 10 thus provides a mechanism for limiting undesirable retransmission of signals, without a requirement of decoding, for example, every packet of a communication to determine how the packet should be processed.

Similar principles apply for examples that include many relaying nodes and/or reflection sites.

Figure 4:
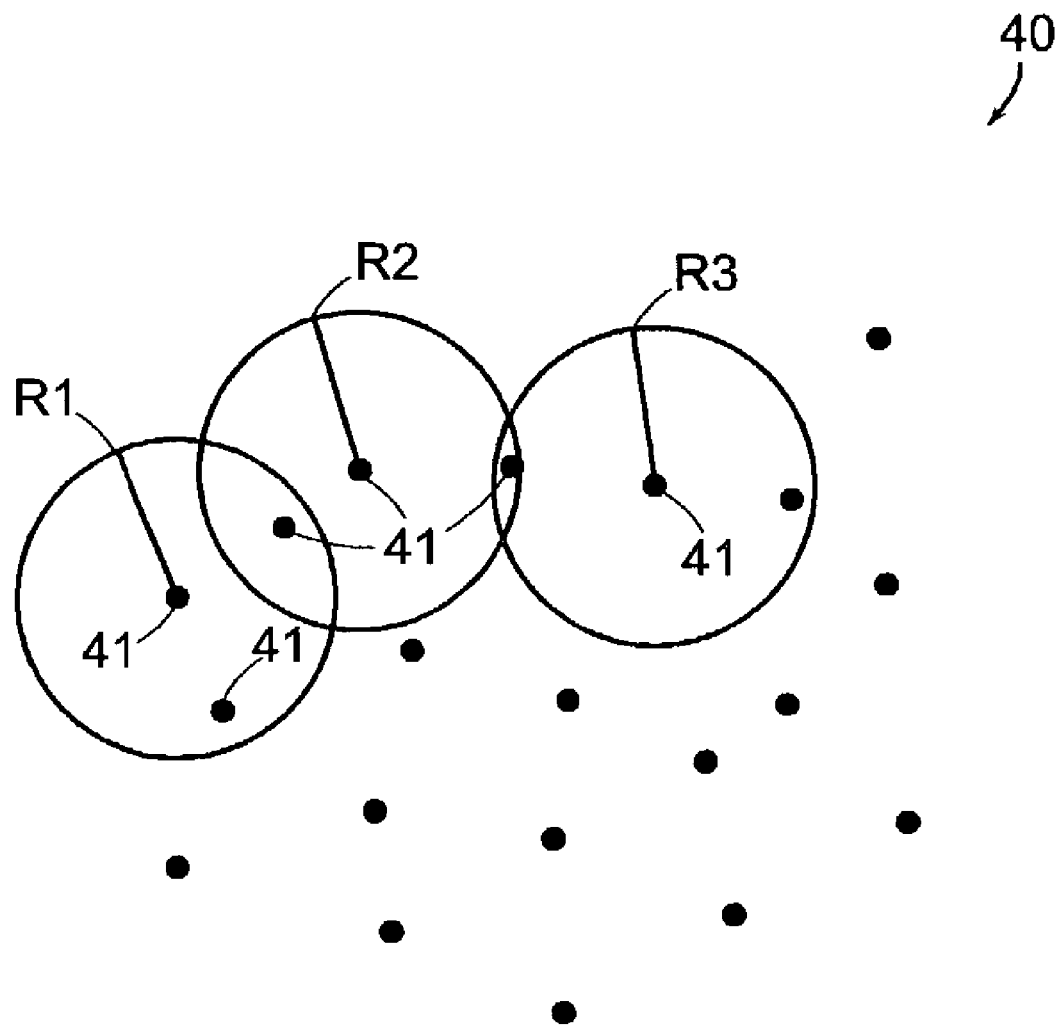
FIG. 4 is a diagram of an embodiment of a network.

Referring to FIG. 4, the method 10 can be implemented in a network that utilizes restricted retransmission power to provide greater efficiency of bandwidth utilization. The method 10 can provide reduced relay delays and reduced system overhead as required to support decoding and recoding of communications.

Referring to FIG. 4, an embodiment of the invention is described in broad overview. FIG. 4 is a diagram of an embodiment of a network 40 which implements the method 10 for signal routing described with reference to FIG. 1. The network 40 includes nodes 41 that send, receive and/or relay signals. The transmission power level is restricted to a level sufficient only for reception of the retransmitted signal by neighbouring nodes within a selected range (indicated, for example, by radii R1, R2, R3 for three of the nodes 41).

Transmission power level can be selected by any of numerous means. For example, during a communications setup operation, intermediate nodes can reduce power levels until a communications chain is broken. This can be done, for example, by passing a token between nodes to indicate that the node having the token is to test power reduction until the chain is broken, and then pass the token along to the next node. Alternatively, each node can reduce power until the chain is broken, then increase power and wait a random interval and try again. This latter method is similar to that employed to determine whether to transmit on a shared channel using Transfer Control Protocol (TCP) on the Internet.

Alternatively, the addition of an intermediate node to the chain can be detected by an increase in received power. Transmitted power can then be reduced to a level sufficient to reach the new intermediate node.

As known to one having skill in the RF communications arts, restriction of the transmission range of individual relay sites in a network can increase the total quantity of communications by permitting reuse of common frequencies in different geographic locations. Thus, a particular frequency can be used simultaneously in different locations.

For example, known multi-hop packet-radio networks permit spatial reuse of radio frequencies. Thus, nodes in different geographic locations can simultaneously use the same radio channels, if there is sufficient physical separation to prevent undesirable interference.

Such a packet radio network, as described, for example, by Shepard in, "A Channel Access Scheme for Large Dense Packet Radio Networks", Proceedings of ACM SIGCOMM '96, can provide relayed communications via a number of hops that is approximately equal to the square root of the number of nodes in the network.

Combining features of the invention with features of a prior art network can improve network communications by eliminating a need for a relaying node to decode a received packet to determine whether or not, and at what frequency or frequencies, to retransmit the packet. While prior systems typically require a decision process regarding selection of a specific node-to-node path for a communication, the present invention can permit real-time decisions based on signal attributes.

Various transmission schemes known to one having skill in the electronic communication arts can benefit from modifications implemented according to principles of the invention.

Principles of the invention can be advantageously applied, for example, to a frequency division multiplexing (FDM) communications system, or to the related orthogonal frequency division multiplexing (OFDM) and coded orthogonal frequency division multiplexing (COFDM) communications systems. As known to one having skill in the radio arts, these systems were developed to provide high-quality digital-audio broadcasting in spite of pulse train distortion arising from multi-path reception.

In these systems, a further frequency-related parameter can be utilized in the forwarding decision process. A missing, though expected, frequency in an OFDM or COFDM system provides an indicator that signals are being received from two or more locations. Hence, a missing frequency parameter can be utilized in a determination of whether the received signal should be retransmitted.

COFDM transmissions, for example, as utilized in Europe, provide duplicate broadcasts from multiple sites on the same channel or set of frequencies. COFDM is thus referred to as a "single frequency network" (SFN). A receiver decodes the transmissions, which generally are additive rather than interfering. Such prior COFDM systems, however, do not relay communications through participant nodes; rather, the common communication is delivered to broadcast antennae, which then broadcast the communication.

FDM-based systems incorporate a transmission scheme in which multiple receivers, at one node, can cooperatively decode a signal that has been distorted by multi-path distortion or origination from multiple transmitting antennae. The system was conceived to cope with the problem of multi-path signals in radio broadcasts. Multi-path signals can be created, for example, by signals bouncing off of structures such as buildings, airplanes or leaves on a tree, thus creating delayed copies of a transmitted signal. Such a signal can be stronger than the originally transmitted signal.

In an FDM system, bits of a wide-band signal are sent relatively slowly on multiple sub-channels. For example, a 4000 bit/second signal can be divided into 4000 1 bit/second signals, which are transmitted on 4000 sub-channels. In effect, a high bit rate signal is divided into multiple, lower-rate signals; each one of the lower rate signals is transmitted on a different narrow-band channel. The narrow-band channels thus carry relatively long pulses that are resistant to loss due to edge deformation; because the bit time is long in each channel, a delayed version of the signal distorts only the edge of a bit, but can add amplitude in the middle of the bit.

Thus, when a multi-path signal is received in a COFDM-based transmission system, the wideband nature of the transmission can ensure that a distorted signal is successfully received. Destructive phase cancellation of only part of the signal will occur. Forward error correction, for example, can be used in the transmission to recover the data in spite of this loss.

FDM-based techniques, according to principles of the invention, can be extended to a multi-hop network. Aspects of the invention can turn the perceived disadvantage of multi-path signals into a source of information regarding the desirability of retransmission of a signal at a particular intermediate node. Thus, features of prior communication systems can be modified, according to principles of the invention, to advantageously utilize information derivable from attributes of a relayed and/or reflected signal in a multi-hop network.

Features of the invention can be applied to other prior art systems that utilize more than one receiving and/or transmitting antenna. Such systems in some cases utilize the multiple antennae either to decode a signal that one antenna fails to receive adequately, or to re-use the same channel in an overlapping area. For example, the vertical-Bell Labs layered space-time (V-Blast) system, as described, for example, by Foschini, et al. in "Simplified Processing for High Spectral Efficiency Wireless Communication Employing Multi-Element Arrays", IEEE Journal on Selected Areas in Communications, vol. 17, No. 11, (1999), is one such system.

In one implementation of the method 10, a modified FDM-based system, for example, provides a reduced bit rate in each channel. Intermediate, i.e., relaying, nodes examine the edges of the bits (the amplitude transitions) to determine if an intermediate node is receiving a signal that has arrived from the original source, or if instead the signal is being received from a source that has had its transmission augmented by another intermediate node.

If the edge indicates that only a small number of intermediate nodes have augmented the signal, then energy is added to the signal (by retransmission), thus relaying the signal along its path. If too great a number of intermediate nodes have augmented the received signal, it is ignored. By this means, systems of the invention can ascertain whether energy can be productively added to the signal.

The principles of the invention can also be applied, for example, to optical transmission systems. Further, signals can be embedded in an isotropic medium, such as a mesh, where all nodes are connected together. The mesh can further provide power to the nodes, as known to one having skill in the communication arts. Thus, communications can be overlaid on a mesh that powers devices connected to the mesh; the mesh can provide targeted, rapid communications among the nodes.

Parameters of utility in the method 10 of FIG. 1 are not limited to those related to an edge distortion of a pulse train. More generally, interacting signals can cause phase shifts and amplitude changes, which can provide parameters for a relay decision process. In a broad sense, each intermediate relay node makes a decision to relay a signal based upon a detectable characteristic of the received signal that indicates, for example, the total delay from an origination or a number of relays that have occurred to that point.

More generally, one can consider the circumstance of two copies of an RF signal arriving at a node, which perceives the two copies as a single signal. The two copies of the signal add to produce a combined signal. If the two copies have no relative time delay, the arriving signal has an amplitude, or amplitude envelope, greater than either copy, but a phase that is the same as both copies.

When the two copies are delayed relative to each other in time (and thus also displaced in phase), the combined signal exhibits more subtle amplitude changes and a phase shift. If the second copy begins to arrive after the first copy has begun to arrive, an amplitude or phase shift distortion can mark the beginning of the arrival of the second copy. This distortion can manifest itself as a sudden change in the amplitude envelope of the combined RF signal and/or a sudden phase shift in the combined RF signal. These amplitude and/or phase distortions can serve as parameters for a decision process.

For example, referring again to FIG. 3B, the pulse arriving at node C exhibits a discontinuity at the trailing end of the indicated edge width portion of the pulse. A change in both amplitude and phase will generally occur at such a discontinuity.

Accordingly, in some embodiments of the invention, a phase distortion parameter of a signal is monitored. One such embodiment is based on a transmission scheme that utilizes quadrature amplitude modulation (QAM). As known to one having skill in the radio arts, a QAM scheme utilizes a combination of amplitude shift keying and phase shift keying. In this embodiment, the relay decision is based on an evaluation of the alteration of the phase of the incoming signal with respect to a reference or expected phase. Other known phase modulation systems can similarly benefit from features of the invention. Moreover, QAM techniques, for example, can be used in each channel of a COFDM transmission.

As another illustrative example, one can consider a network-based on AM modulation signals. When an AM transmission is relayed or reaches a receiver from two sources, that receiver receives the sum of the two signals. The sum, in this example, is a simple sum of two sinusoids of the same angular frequency, producing a signal having an amplitude that is scaled by the phase difference and a phase that is shifted relative to the two source signals.

In this example, the two arriving signals are shifted in phase because one of the signals was relayed, and thus was subjected to a small time delay, i.e., a small phase delay, introduced by the RF processing required to make the decision whether to relay or not.

The combined received signal is a continuous AM transmission having an abrupt change in phase and amplitude at the time the second (or relayed) version of the signal is received at the antenna. This discontinuity can indicate that the signal has been relayed. Realization of this example embodiment would generally require a synchronous carrier transmission system to provide frequencies of two transmitters that are precisely equal.

Such synchronization can be maintained by retransmitting a phase reference from node to node as well as by receiving a master synchronization signal from a broadcast receiver that all nodes can receive. Preferably, the frequency of the various carriers is maintained closely enough to avoid intermodulation distortion of the received signal due to a frequency difference.

This exemplary embodiment relies on phase differences rather than absolute phase values, since the phase discontinuity can be used to support the relay operation, rather than the absolute phase with respect to a master signal. A reference phase can be relayed on a separate channel, and used in by receiver to trigger or phase-lock the master oscillator that each receiver uses for transmission.

Amplitude and phase distortions can manifest themselves, for example, as "ghost" images in conventional television broadcasts, that is, a second image shifted from the first, and occurring with some amplitude difference. In the 1980's, receiver manufacturers attempted to correct this distortion by developing "ghost-elimination" circuits that operated on the demodulated video. These operated by shifting and adding the video signal to correct for the temporal offset of multiple, delayed transmissions. When this is done, the result can be an improved signal because the shifted versions then add energy to the original signal rather than appearing on the screen as coherent noise (i.e., the delayed, shifted image.)

A conventional television system typically includes a periodic synchronization signal to support calculation of multipath distortion. In contrast, some systems implemented according to principles of the invention, utilize, for example, the RF domain and the related RF distortion to indicate multiple relays of the signal rather than multi-path distortion.

The above-described principles of signal distortion and detection can be applied to a phase-modulated and/or amplitude-modulated digital signal. Digital signals are commonly used in communications, for example, in the above-described COFDM transmissions.

Moreover, principles of the invention can be applied even when received signals do not have the same frequency. For example, this situation arises, as described below, when two channels are used by nodes for a single communication, one for reception and one for transmission.

In this case, an ultimate receiver can receive a plurality of signals on two channels (e.g., channels A and B) depending, for example, on the number of relays on channel A versus channel B. A real-time, intermediate repeater can then receive a signal on either channel A or B, depending on where it is in the relay chain, and retransmit the signal on the other channel. An ultimate receiver or intermediate, potential repeater, can receive on channels A and B signals having an amplitude and a phase discontinuity as described above.

As one alternative, a receiving node can translate both channel A and channel B signals to an intermediate frequency to determine the relative delay of the two signals. Alternatively, the amplitude and phase distortion can be determined for each independent of the other. In either case, the analysis can support a relaying decision.

Some embodiments base a relay decision on a signal delay relative to a temporal reference, for example, provided by a reference clock. For example, nodes can synchronize an internal clock reference to a global reference clock. As another alternative, nodes can cooperatively communicate to synchronize internal reference clocks. Thus, use of a global time reference is not needed.

Thus, for example, retransmission can be limited to pulses having less than a maximum delay, as determined, for example, from a delay relative to a reference clock time. In another embodiment, the monitored parameter includes only the delay of the received signal relative to the time of transmission of the signal from an original source. In this embodiment, the predetermined criterion can be a maximum delay relative to the time of transmission of the signal from the original source.

In some embodiments of a system, which implements features of the invention, the nodes establish a common time reference, at least at a local level across neighbors, and further can perform position estimation. Time synchronization of nodes can be implemented via methods known to those having ordinary skill in the telecommunications arts. In some cases, the parameter of the signal is a measure of time compared to a reference time that is agreed upon by all members of the network.

A reference clock can also be used to prevent a retransmitted pulse from extending beyond an allotted time interval. Thus, a pulse can undergo a gradual shortening as the pulse is repeated. Common transmission schemes, however, have such long pulse lengths that the shortening effect can be very small in comparison to the pulse length.

In some embodiments, in which a signal commences retransmission prior to completion of reception, the relay node first determines the destination of the signal. This determination can be accomplished, for example, via an initialization phase, during which a virtual circuit is established between sender and receiver by methods known to one having skill in the network communication arts.

One such method is based on a Asynchronous Transfer Mode (ATM) related transmission scheme. A virtual circuit is set up and characterized by a key sequence common to all the relay nodes. The key is disseminated during the virtual circuit setup, so that the nodes know whether or not they should relay a particular signal.

As indicated above, prior transmission systems have attempted to cope with the problem of a retransmitted signal interfering with a received signal. There are several alternatives that can adequately circumvent this problem.

For example, a signal can be retransmitted via a frequency that is different than a frequency of the received pulse. For example, a relay system using the principles presented herein can operate by using two channels as a pair. A relay node can receive a signal on one of these and echo it on the other. Thus, it can simultaneously receive and transmit, with the retransmission decision made by processing the incoming, incident radio frequency signal. Retransmission of a pulse of a pulse train, for example, can commence prior to completion of reception of the pulse.

In another alternative, applicable, for example, to cable systems, a received signal is retransmitted, via a directional coupler, only in a forward direction. Similarly, for example, for an optical system having a wavelength that is short in comparison to an antenna size, one antenna can support radiation without the radiation reaching the receiving antenna or photodiode. The transmitting antenna can be, for example, a laser or light emitting diode (LED).

As a further alternative, some systems include nodes that receive and transmit a signal on the same frequency, but at different times. Thus, a node can receive a signal on a particular frequency, and then block reception on that frequency while retransmitting the signal on the same frequency. Reception of a frequency can be blocked, for example, by ceasing reception on the frequency. As used herein, the term "blocked" can refer to any intentional cessation of reception of a signal.

In a time-domain multiplexing embodiment, a signal is received for a long enough period of time to confirm adequate reception. Then, the receiver is shut off, and the signal is synthesized for retransmission. This approach can work, for example, when the bits in a signal can be identified without receiving the entire bits.

In an illustrative example, a signal includes sub-channels having a bit rate of 1 bit/second. In this example, a node requires 0.1 second to determine the state of a sub-channel, i.e., on or off. Hence, the receiver of the node need only be turned on for only 0.1 second to determine the state of a sub-channel, i.e., a zero-bit (e.g., off) or a one-bit (e.g., on). While the receiver is turned off, the node can retransmit the zero-bit or one-bit, as received, with a delay of only 0.1 second. This process can be repeated, with the receiver intermittently turned on and off.

It should be noted that in the above illustrative example, as in other embodiments described herein, the node, in effect, propagates two signals: the received signal that continues travelling past the node; and the signal retransmitted on the same frequency. Thus, the received signal is reinforced, and a distortion is introduced due to combination of the signals, which can be advantageously utilized, as described herein.

A node can retransmit a signal by any of several means. For example, a signal, can be collected and digitized prior to retransmission. A distorted edge of a pulse can be reproduced in the retransmitted signal, or the retransmitted signal can provide a clean edge for a retransmitted pulse (but with the distorted portion clipped, so the retransmitted pulse is shortened).

If the retransmitted signal has a frequency different from the arriving signal, the node can demodulate the incoming signal, and then remodulate the signal upon retransmission at a different frequency. The demodulation and remodulation will entail a small analog-based processing delay. Alternatively, for retransmission at a different frequency, a frequency translator can be employed by the node.

We now turn to the pathway membership decision process. In some alternative embodiments of the method 10, nodes in the network maintain information regarding communication pathways. For example, as known to one having skill in the telecommunication arts, nodes can maintain routing tables, which can be constantly updated. A node can thus determine whether or not it is a participant for relaying of a particular communication carried by a particular signal.

For example, a node may identify a supported communication by the frequency of that communication. If a presently unsupported frequency is received, it is not retransmitted. The maintained routing table of supported frequencies can be constantly updated via information exchanged with other nodes in the network.

In another implementation, a node determines if it is in the path of a communication at the time a communication oath is initiated. This can be accomplished, for example, via a decoded computation of the base-band information of an RF-packet signal. This implementation entails an initial setup delay, analogous to that required to initiate a telephone conversation.

When the communication is a two-way communication, as opposed to a broadcast communication, a path can be defined to include nodes that support communication in one or both directions.

As another alternative, network nodes can be shut off to test if a communication is interrupted. For example, if a communication can proceed without error when a particular node is removed from participation in the communication, then the node can be productively excluded from the pathway.

As a further example, assume that the communication is two-way and that different channels or frequencies are used for each direction between two nodes A and B. This is common in a duplex transmission. Hence, information can be simultaneously exchanged in both directions between A and B. A node is "in the path" between A and B if the delay in both directions or the power in the communications is below a threshold. In some embodiments, the power is approximately equal for a relay node to be "in between" any two other nodes.

FIGS. 5A through 5F are diagrams that illustrate various 2-node, 3-node, and 4-node geometries of a portion of an embodiment of a network. In these examples, nodes A and B exchange communications, with or without the participation of nodes C and D.

Figure 5A:
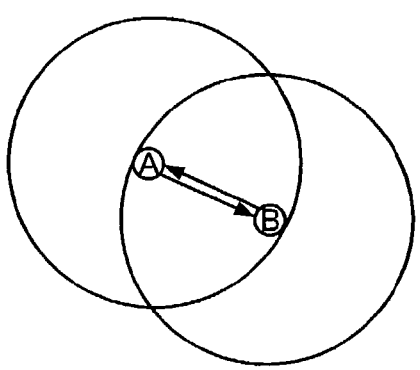
FIGS. 5A through 5F are diagrams of communication flow in portions of a network.

FIG. 5A illustrates a case where node C is not physically in between nodes A and B, and nodes A and B transmit with sufficient power to directly signal to each other. Node C is far enough away so that power levels are too low to effectively receive the signal from either A or B.

Figure 5B:
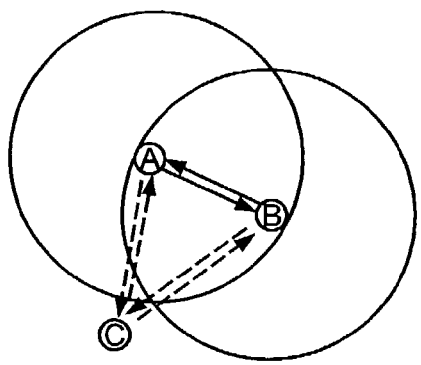
Figure 5C:
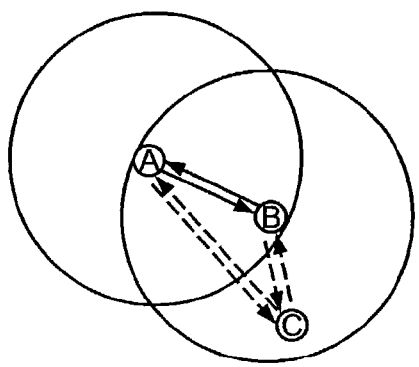
Figure 5D:
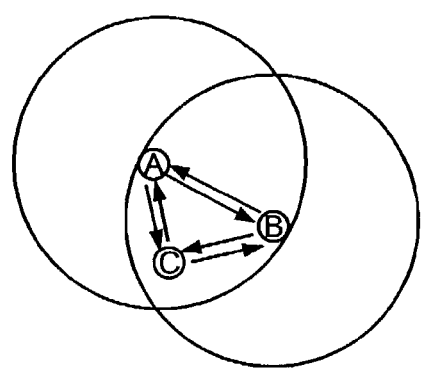

FIGS. 5B, 5C and 5D illustrate a case where node C moves from a location outside the communication pathway between nodes A and B (FIG. 5B or FIG. 5C) to a location within the path between nodes A and B (FIG. 5D). As illustrated in FIG. 5B, the delays of signals received by node C from nodes A and B are approximately equal to each other (if signals are received). The delays, however, are above a threshold, so node C does not relay. As illustrated in FIG. 5C, the delays of signals received by node C from nodes A and B are unequal to each other (if a signal is received from node A), so node C does not relay.

As node C moves into the path (FIG. 5D), node C can detect the signals from both node A and node B, and node C can then relay or repeat the signals. As illustrated, node C forwards signals when its delay from each transmitter is approximately equal, thus indicating that node C is within reception range of both nodes A and B and occupies a location approximately in between nodes A and B.

When these conditions for node C are satisfied, then nodes A and B will each begin to receive a signal that has been repeated. As described above for the method 10, the nodes can detect when they are receiving multiple transmissions of a signal. Each of the nodes, A and B, can then reduce the power of their transmission.

In particular, node A can reduce its power to below the level that would be necessary to reach node B without the additional signal as provided by node C, and conversely node B can perform the same reduction. Node C can also reduce its transmission power until the communications link is broken and then increase it again to make the communications work. This can cause a momentary interruption in a communication.

There are means known to one of skill in the art that can be utilized to make an interruption undetectable to communications system users. Alternatively, for example, nodes A and B can make the power determination by reducing emission power based on the presence of additional received power contributed by node C, without interrupting the communication.

Figure 5E:
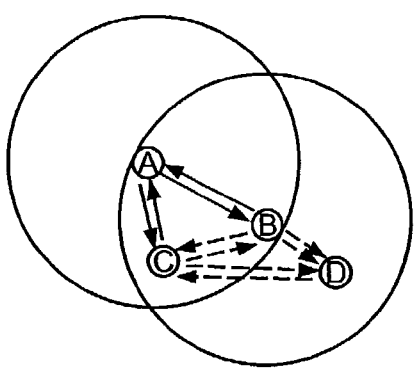

FIG. 5E illustrates a similar case to that described for 5B, 5C and 5D. In the present case, node C satisfies pathway membership criteria, and forwards communications received from nodes A and B. Node D fails to satisfy membership criteria, and does not forward the communications.

In one embodiment that involves one-way communication from a node A to a node B, a node C need only be located within the radius of communication of node A to forward communications received from node A. Node B can then receive a signal from both nodes A and C and can base a relay or repeat decision on its location relative to nodes A and C. For a network with many nodes, the relay decision can be structured to prevent propagation of the signal in directions that are outside an approximately elliptical region that is defined in part by elliptical foci at the locations of nodes A and B.

Figure 5F:
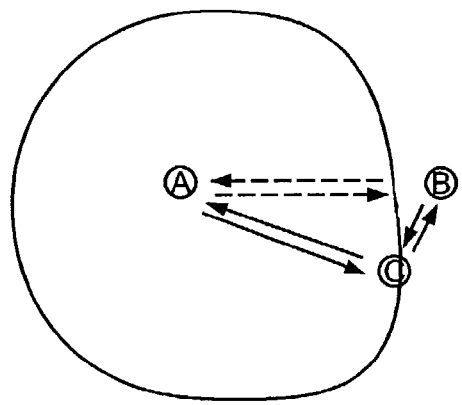

FIG. 5F illustrates an embodiment in which node C may fail membership criteria, but still be granted membership because it can usefully forward communications between nodes A and B. This embodiment provides the ability to "see around corners." An intermediate relay node, e.g., node C, may not be equidistant from both end nodes. However, when node C senses radiation from one channel of a two-way pair and the lack of a reverse channel response, it can attempt to relay the forward signal to see if that causes a reverse response.

This in-the-path determination can provide an emergency mode of operation, which allows an intermediate node to be programmed to test forward transmission when it would otherwise violate the geometry constraints of the previous examples in order to complete a chain of connection between the originating node and the intended recipient. Put another way, this implementation of the method 10 supports a node that, upon receiving a signal, immediately attempts to relay it even though it has not received a reverse channel signal and thus cannot detect whether it is in-the-path as described above. This brief, potentially useless radiation, if found to complete the circuit can then be used to indicate to the node that it is a necessary relay, and it will therefore continue to relay even though the geometric constraint is not satisfied.

Thus, a node that is not in a defined pathway can nevertheless be included in a communications link if the node supports an otherwise failing communication. For example, if the node that is not in the pathway senses a failure of a response in a two-way communication, the node can begin relaying the communication in an attempt to complete the two-way link. Related embodiments can mitigate failing communications occurring, for example, when a node in a pathway experiences a breakdown or its signal is blocked. Thus, for example, a node that fails a geographic geometry constraint for membership in a pathway can join the pathway, when desirable.

Such implementations of the method 10 and the node 20 provide intermediate nodes that permit, for example, a signal to reach places where the signal from a remote tower would not penetrate the environment well enough to permit reception. In this case, intermediate nodes provide snaking of the signal into places that would otherwise be blanked.

The above-described examples can include a channel assignment, which can be applied in pairs. Any channel used to initiate a communication can be termed a "forward channel," and for each forward channel, there can be a pre-assigned "reverse channel" that will be used by a terminal node responding to the communication. All nodes in the system know this assignment, and therefore know which two channels to test for relaying.

Prior radio communication systems utilize such channel assignments. For example, VHF-FM marine communications on channel 22A (used by the US Coast Guard) has a defined transmit/receive pair, as do many International Telecommunication Union (ITU) defined high frequency single sideband channels. These features can be dynamically reloaded or hardwired into a the design of a transceiver Moreover, when a communication is initiated, the ultimate recipient can decode the information without relaying it. Intermediate nodes, when they enter radiation range, can also decode the signal to determine if it is intended for them. Parameter-based, e.g., RF-based, relaying proceeds when the intermediate node has determined that the communication is not intended for the the intermediate node, and that the intermediate node may thus function as a relay.

In some implementations, an intermediate node decodes information while in the act of relaying it, and thus we can alter the intent of the system to provide-low-power broadcast distribution where each intermediate decodes the signal and simultaneously passes it along to others. In these implementations, the return path may carry no productive data, but is used to allow intermediate nodes to determine whether they are useful broadcast relays.

Features of the invention have application in mobile voice networks such as telephony because the low lag permits a telephone-quality conversation. In addition, it can be used to conserve power in the networked devices, since each one need only radiate a signal with enough strength to reach nearby nodes, rather than a fixed base station. When radio frequency modulation is used for the inter-node communications, the same frequency channels may be re-used in the same geographic area, since the radiation from other, nearby nodes is at a low power. By contrast, a cellular radio system uses each channel only once in each cell region.

The signal can be propagated by more than one node at once, and can be received by intermediate or terminal nodes in the network from more than one source without interference. In operation, these multiple copies of the same signal reinforce each other and allow for low power radio use.

As described above, in various implementations, the invention provides several advantageous features relative to prior communication methods and systems. Some illustrative advantages that can be realized in various implementations are: increased capacity in a mobile telephone system; improved traffic control; a scalable information distribution system that requires no centralized control; network capacity provided by members rather than a central authority; network communications with efficiencies derived from node cooperation and proximity; power savings; communication delay reductions; and efficient use of bandwidth.

Variations, modifications, and other implementations of what is described herein will occur to those of ordinary skill in the art without departing from the spirit and the scope of the invention as claimed. For example, some implementations employ directional antennae. Accordingly, the invention is to be defined not by the preceding illustrative description but instead by the spirit and scope of the following claims.

What is claimed is:

1. A method for routing signals through a communications network, the method comprising:
   receiving a signal at an intermediate node;
   monitoring, at the intermediate node, a parameter derived from the signal domain and measured by examination of an initial portion of the received signal, the parameter being characteristic of the energetic or physical makeup of the received signal and indicating an extent of prior retransmission of the signal; and
   forwarding the received signal from the intermediate node to a second node or a destination receiver only if the intermediate node is a member of a predefined communications pathway between the received signal's origination and destination nodes and the parameter associated with the signal satisfies at least one predetermined criterion, the predetermined criterion being selected to ensure that the received signal will only be forwarded if forwarding the signal will enhance reception and decoding of the signal at the destination receiver.

2. The method of claim 1, wherein the signal is associated with one of an analog communication and a digital communication.

3. The method of claim 1, wherein the parameter comprises at least one of an amplitude, a phase, and a time delay of the signal.

4. The method of claim 1, wherein the parameter comprises a phase of the signal, and the at least one predetermined criterion comprises a predetermined maximum phase shift.

5. The method of claim 1, wherein the signal comprises a plurality of pulses each having an amplitude and a duration.

6. The method of claim 5, wherein the parameter is associated with a shape of an edge of a pulse of the plurality of pulses.

7. The method of claim 5, wherein the parameter is associated with a width of the edge.

8. The method of claim 5, further comprising causing selection of a pulse duration that is greater than a preselected maximum permissible pulse time delay.

9. The method of claim 5, wherein the step of forwarding comprises beginning retransmission of a pulse of the plurality of pulses prior to completion of receiving the pulse.

10. The method of claim 1 wherein the step of forwarding further comprises forwarding the signal with a power level sufficient only for reception of the forwarded signal by neighboring nodes within a selected range.

11. The method of claim 1, wherein receiving comprises receiving the signal from more than one location, and the step of forwarding comprises forwarding the signal to more than one location.

12. The method of claim 11, wherein each one of the locations is one of a node and a reflection site.

13. The method of claim 5, wherein the at least one predetermined criterion comprises a threshold time delay, and the parameter comprises a pulse time delay, and the step of forwarding comprises forwarding a pulse of the plurality of pulses if the pulse time delay does not exceed the threshold time delay.

14. The method of claim 5, wherein the parameter comprises a pulse time delay relative to a reference time, and the at least one predetermined criterion comprises a preselected maximum acceptable pulse time delay.

15. The method of claim 5, wherein the parameter is associated with a number of times a pulse of the plurality of pulses has been relayed.

16. The method of claim 5, wherein a pulse of the plurality of pulses arises from a combination of pulses received from a plurality of locations.

17. The method of claim 1, wherein the step of forwarding comprises forwarding the signal via a frequency that is different than a frequency of the received signal.

18. The method of claim 1 wherein the signal consists of one of a radio signal, a light signal and an electrical signal.

19. The method of claim 1, wherein the step of forwarding comprises forwarding the signal while ceasing reception of a second signal having a frequency effectively the same as a frequency of retransmission.

20. The method of claim 1, further comprising receiving a plurality of signals, and repeating the step of forwarding the signal for each of the plurality of signals.

21. The method of claim 1, wherein the signal comprises a plurality of sub-signals that each are associated with a different frequency within a band of frequencies.

22. The method of claim 1, wherein the transmitted signal is associated with at least one message.

23. A communications network node configured to implement the method of claim 1.

24. A system for signal routing, comprising:
a receiver for receiving a signal at an intermediate node;
at least one monitor for monitoring, at the intermediate node, a parameter derived from the signal domain and measured by examination of an initial portion of the signal, the parameter being characteristic of the energetic or physical makeup of the received signal and indicating an extent of prior retransmission; and
a transmitter for forwarding a signal from the intermediate node to a second node or a destination receiver only if the intermediate node is a member of a predefined communications pathway between the received signal's origination and destination nodes and the parameter associated with the signal satisfies at least one predetermined criterion, the predetermined criterion being selected to ensure that the received signal will only be forwarded if forwarding the signal will enhance reception and decoding of the signal at the destination receiver.

25. The system of claim 24, wherein the receiver, the monitor and the transmitter are components of a network node.

26. The system of claim 24, further comprising a processor for comparing the parameter to the predetermined criterion.

27. The method of claim 1, wherein the parameter comprises a duration of signal edge distortion or an abrupt pulse amplitude or phase change.

* * * * *